United States Patent Office 3,250,739
Patented May 10, 1966

3,250,739
FLAME-RETARDANT POLYOLEFIN COMPOSITIONS CONTAINING ANTIMONY TRIOXIDE AND TRI-BROMINATED PHENYL ETHERS
Hermann Sauer, Alfred Schmidt, and Kurt Kopetz, all of Marl, Kreis Recklinghausen, Germany, assignors to Chemische Werke Huls AG, Recklinghausen, Germany
No Drawing. Filed June 27, 1961, Ser. No. 119,814
Claims priority, application Germany, Sept. 30, 1960, C 22,444
10 Claims. (Cl. 260—45.75)

This application is a continuation-in-part of applicants' copending application Ser. No. 77,017, now U.S. Patent No. 3,141,860.

This invention relates to novel compositions which can be added to polyolefins to increase the fire resistance of articles fabricated of polyolefinic materials.

There have been a great many compositions which have been disclosed in the prior art for the flameproofing of various organic materials, particularly polyolefins. The state of the art, however, is such that there exists no panacea for the problem of fire resistance in connection with polyolefinic materials. Consequently, there is always a need for a better fire resistant composition. Of the multitude of materials that have ben suggested for flameproofing, it has been found that certain brominated ethers were more or less successful.

These brominated ethers were mixed with antimony trioxide and a polyolefin. Based on 100 parts by weight of polyolefins, about 5–20 parts by weight of ether and 3–10 parts by weight of antimony trioxide were found to be satisfactory. This invention deals with improved flameproofing compositions based on the discovery that specific brominated ethers yield better results.

The object of the present invention therefore is to provide novel compositions which when added to polyolefins yield mixtures which exhibit excellent fire resistant and self-extinguishing properties. Upon further study of the specification and appended claims other objects of the present invention will become apparent.

To attain the objects of this invention it has been discovered that excellent polyolefinic compositions can be prepared by utilizing as the brominated ether halogensubstituted products of phenyl alkenyl ether and phenyl benzyl ether. More specifically, it is preferred to use halogenated products of phenyl allyl ethers, phenyl methallyl ethers and phenyl benzyl ethers wherein the alkenyl groups contain 2–4 carbon atoms.

To be effective, these ethers must contain at least 3 bromine atoms substituted on the nuclei thereby resulting in a bromine content of at least 50%. Furthermore, the total halogen content of the ether is 50–85% by weight of the molecule. It is preferred to substitute chlorine for bromine when a higher degree of halogenation is employed; specifically it is possible to use up to 30% by weight of chlorine in the molecule as long as there is at least 50% bromine, and the total weight percent of halogen does not arise above about 85%. The halogen quantities exceeding 3 bromine atoms can be bound in any desired position, either on the ring or on an attached chain.

Derivatives of these aforementioned ethers are also efficient for rendering polyolefins fire resistant. For example, excellent compositions are obtained when the ethers are substituted on the ring by from 1 to 2 alkyl groups, said alkyl chains being either straight or branched, and containing 1 to 4 carbon atoms.

One of the features of this invention is that it has been surprisingly discovered that crude mixtures of halogenated compounds can be advantageously utilized, which mixtures comprise products of different halogen contents and various isomers. Most unexpectedly it has been discovered that these crude halogenates are often more compatible with polyolefins than are chemically pure compounds.

In general, all polyolefins can be made more fire resistant by mixing them with the ethers of the present invention. Of the polyolefins, polyethylene, polypropylene, polyisobutylene and polystyrene are particularly improved by this invention. Of course, there polyolefinic compounds can also contain the usual additives such as coloring materials, stabilizers, antistatic agents and mold release lubricants.

In general the quantity of 5–20% by weight of the ethers yields desirable results. Preferred results are attained with 6–12% by weight of the ethers; the most prefered results are obtained when 10–12% by weight of the ethers is utilized, said value being based on the polyolefins. Antimony trioxide is employed in the polyolefinic mixture in 3–10% by weight, preferably 4–8% by weight of the polyolefin.

These compositions are produced in any known manner, the sequence of adding the fire resistant compounds being of no consequence. Furthermore, these compositions are amenable to all of the known fabrication techniques such as injection molding or the like.

The fire resistance of the compositions of this invention can be determined by any number of methods, but for purposes of comparison reference is made to the test procedures outlined in DIN 4102. The term DIN 4102 is an abbreviation which refers to the Deutsche Industrie-Norm (German industrial standard) No. 4102. In brief, this test involves the production of plates having dimensions of 1000 x 190 x 4 mm., which plates are clamped vertically in a frame and suspended in the shaft of a furnace. These sample plates are then subjected to flames from a ring burner, the composition of these flames being carefully controlled. For the designation of self-extinguishing fire resistant mixtures, the plates must not continue to burn after removal of the flame.

The compositions of this invention were tested in a manner similar to DIN 4102 on plates of 300 x 70 x 4 mm. These plates were flamed in a shaft furnace with a colorless Bunsen flame for four minutes. After removal of the Bunsen flame which incidentally is 15 cm. long, the time for extinction of the flame is determined. Compositions which are extinguished shortly after the removal of the Bunsen flame also meet the requirements of DIN 4102 and can be called difficultly inflammable. For the purposes of orientation, a short time is about up to 4–10 seconds.

The compositions of this invention comprising the bromo-substituted ethers in combination with antimony trioxide and polyolefins not only exhibit excellent fire resistant properties, but also exhibit excellent mechanical properties and can thereby be utilized in those areas of construction which require structural elements having high strength and fire resistant properties.

To further illustrate this invention, the following examples serve as preferred specific embodiments of this invention, but they are not to be construed as in any way limitative of the remainder of the specification and appended claims.

Example 1

100 parts by weight of polyethylene, 10 parts by weight of brominated phenyl benzyl ether containing 57% by weight of bromine in the molecule, and 5 parts by weight of antimony trioxide are compounded in a roll mill at 190° C. and subsequently granulated. The granulated material is then processed into plates of 300 x 70 x 4 mm. which are then flamed in a shaft furnace for 4 minutes with a decolorized Bunsen flame of 15 cm. in length. After removal of the flame, the plates are self-extinguishing within a short time.

*Example 2*

100 parts by weight of polyethylene, 10 parts by weight of a halogenated phenyl benzyl ether containing 70 weight percent bromine and 7.3 weight percent chlorine, and 5 parts by weight of antimony trioxide are processed into plates in accordance with Example 1. By testing in the same manner as in Example 1, it is found that these plates are immediately self-extinguishing.

*Example 3*

100 parts by weight of polyethylene, 10 parts by weight of a brominated phenyl allyl ether containing 64.5 weight percent bromine in the molecule, and 5 parts by weight of antimony trioxide are processed into plates in accordance with Example 1. By testing in the same manner as in Example 1 it is found that these plates are immediately self-extinguishing.

*Example 4*

100 parts by weight of polyethylene, 10 parts by weight of a brominated phenyl methallyl ether containing 62.4 weight percent of bromine, and 5 parts by weight of antimony trioxide are processed into plates in accordance with Example 1. Upon testing, these plates like the plates of the previous examples are also found to be immediately self-extinguishing after the flame is removed.

The preceding examples can be repeated employing other polyolefins with similar results. Particularly good results are obtained when instead of polyethylene there is used polypropylene or polyisobutylene or polystyrene.

It is to be appreciated that the ethers and the antimony trioxide can be compounded together to form a composition which can be added to the polyolefin. As a matter of fact, it is foreseeable that manufacturers can merchandise a composition containing the ethers of this invention together with antimony trioxide. Of course the ratio of these two ingredients would be 5–20 parts by weight of the ether, and 3–10 parts by weight of the antimony trioxide, with the preferred ratios being the same as discussed previously, specifically 6–12 or 10–12 parts of the ether to 4–8 parts of the antimony trioxide.

It is also evident that mixtures of the various ethers can be successfully utilized in this invention. Furthermore, all types of polyolefins can be benefited by the ether-antimony trioxide composition of this invention. As new polyolefinic polymers are synthesized they will also be benefited by the teachings of the present invention.

It is understood that the inventors intend to claim, as a part of their invention, any variation, substitution and changes that lie within the scope of the invention and the hereinafter appended claims and intend to include within the scope of said claims such changes as may be apparent to those skilled in the art in the practice of the principles of this invention and within the scope as set forth in the hereinabove stated specification.

What is claimed is:

1. A fire-resistant composition comprising 100 parts by weight of a normally solid polymer selected from the group consisting of homopolymers of alpha mono-olefins and polystyrene, 3–10 parts by weight of antimony trioxide, and 5–20 parts by weight of halogenated ether selected from the group consisting of halogenated phenyl alkenyl ethers, and halogenated phenyl benzyl ethers, wherein the alkenyl group contains 2 to 4 carbon atoms, and mixtures thereof, said ethers containing at least 3 bromine atoms substituted on the nuclei thereby resulting in a bromine content of at least 50%, the total halogen content of the ether being 50–85% by weight of the molecule.

2. The composition of claim 1 wherein the normally solid polymer is polyethylene.
3. The composition of claim 1 wherein the normally solid polymer is polypropylene.
4. The composition of claim 1 wherein the normally solid polymer is polyisobutylene.
5. The composition of claim 1 wherein the normally solid polymer is polystyrene.
6. The composition of claim 1 wherein the ether contains up to 30% by weight of chlorine.
7. The composition of claim 6 wherein the normally solid polymer is polyethylene.
8. The composition of claim 6 wherein the normally solid polymer is polypropylene.
9. The composition of claim 6 wherein the normally solid polymer is polyisobutylene.
10. The composition of claim 6 wherein the normally solid polymer is polystyrene.

References Cited by the Examiner

UNITED STATES PATENTS

| 3,075,944 | 1/1963 | Wick et al. | 260—45.7 |
| 3,141,860 | 7/1964 | Sauer et al. | 260—45.7 |

FOREIGN PATENTS

| 2,808,255 | 1/1959 | Great Britain. |

OTHER REFERENCES

German published application of Peters et al., 1,104,693, published Apr. 13, 1961.

LEON J. BERCOVITZ, *Primary Examiner.*

MILTON STERMAN, *Examiner.*

T. D. KERWIN, G. W. RAUCHFUSS, JR.
*Assistant Examiners.*